(12) United States Patent
Abe

(10) Patent No.: US 6,788,454 B2
(45) Date of Patent: Sep. 7, 2004

(54) VIEWING APPARATUS HAVING A PHOTOGRAPHIC FUNCTION

(75) Inventor: Tetsuya Abe, Hokkaido (JP)

(73) Assignee: PENTAX Corporation, Tokyo (JP)

( * ) Notice: Subject to any disclaimer, the term of this patent is extended or adjusted under 35 U.S.C. 154(b) by 46 days.

(21) Appl. No.: 10/255,691

(22) Filed: Sep. 27, 2002

(65) Prior Publication Data
US 2003/0086164 A1 May 8, 2003

(30) Foreign Application Priority Data
Sep. 28, 2001 (JP) ........................ 2001-300480

(51) Int. Cl.⁷ ............................... G02B 23/00
(52) U.S. Cl. ................ 359/363; 359/362; 359/721; 396/148; 396/84
(58) Field of Search ................ 359/407, 362, 359/363, 399, 410, 411, 412, 721, 745, 746, 747, 748, 749, 750, 751, 752, 753; 396/84, 148, 149, 150, 151, 152, 432, 429

(56) References Cited

U.S. PATENT DOCUMENTS

| 4,067,027 A | 1/1978 | Yamazaki ............ 354/79 |
| 4,262,988 A | 4/1981 | Ishibai et al. ......... 350/36 |
| 4,400,065 A | 8/1983 | Nagler ................. 350/476 |
| 5,576,779 A * | 11/1996 | Ikemori et al. ......... 396/79 |
| 5,583,692 A | 12/1996 | Funatsu ................ 359/422 |
| 5,729,390 A | 3/1998 | Abe ...................... 359/661 |
| 5,926,657 A | 7/1999 | Hasushita ............ 396/148 |
| 6,088,053 A | 7/2000 | Hammack et al. .... 348/61 |
| 6,233,097 B1 * | 5/2001 | Mihara ................ 359/633 |
| 6,542,295 B2 * | 4/2003 | Boys et al. ........... 359/410 |
| 2001/0028498 A1 | 10/2001 | Haga et al. .......... 359/407 |

FOREIGN PATENT DOCUMENTS

| JP | 57-79909 | 5/1982 |
| JP | 62-96919 | 5/1987 |
| JP | 5-2132 | 1/1993 |
| JP | 6-2330 | 1/1994 |
| JP | 7-8848 | 2/1995 |
| JP | 7-283978 | 10/1995 |
| JP | 2624556 | 4/1997 |
| JP | 11248996 | 9/1999 |
| JP | 2001-281555 | 10/2001 |
| JP | 2001-311868 | 11/2001 |
| WO | 01/52531 | 7/2001 |

OTHER PUBLICATIONS

English Language Abstract of JP 11-248996.
English Language Abstract of JP 2001-311868.

* cited by examiner

Primary Examiner—Drew A. Dunn
Assistant Examiner—Joshua L Pritchett
(74) Attorney, Agent, or Firm—Greenblum & Bernstein, P.L.C.

(57) ABSTRACT

A viewing apparatus with a photographing function, includes a viewing optical system by which an image of an object, formed by a positive objective optical system, is viewed though a positive eyepiece optical system, and a photographing optical system which is provided independently from the viewing optical system. The photographing optical system covers substantially the same field of view as that of the viewing optical system. The viewing apparatus satisfies the following condition:

$$0.1 < ft/fo < 0.7 \qquad (1)$$

wherein
ft designates the focal length of the photographing optical system, and
fo designates the focal length of the objective optical system of the viewing optical system.

9 Claims, 5 Drawing Sheets

Fig. 3
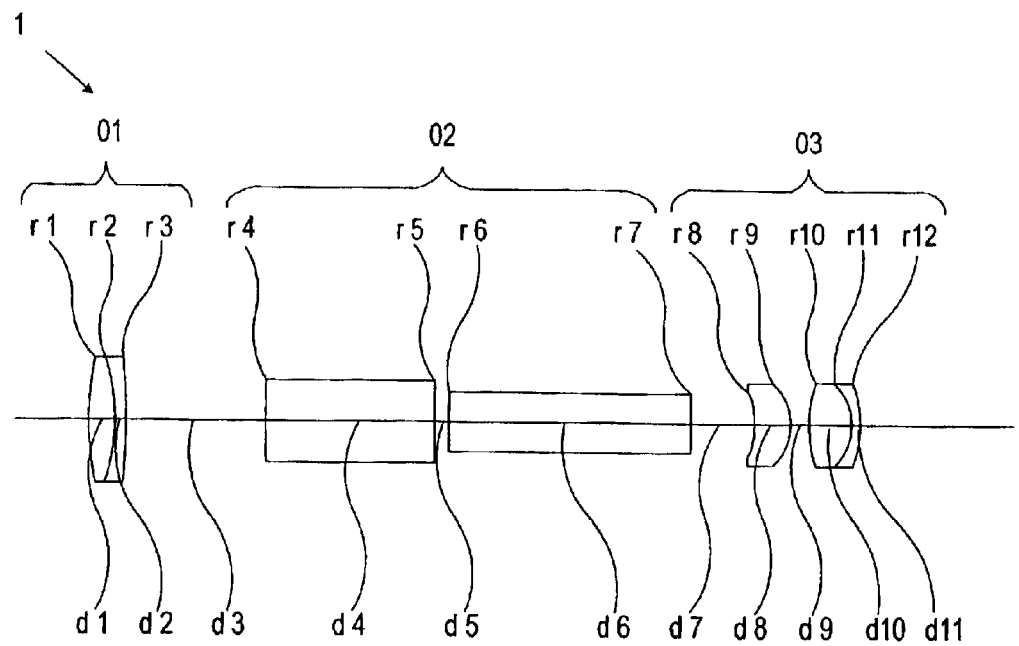
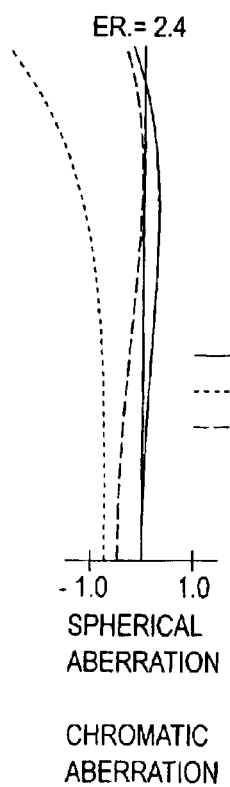
Fig. 4A
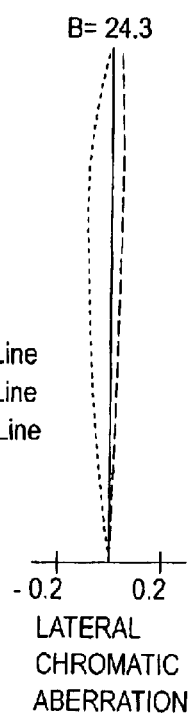
Fig. 4B
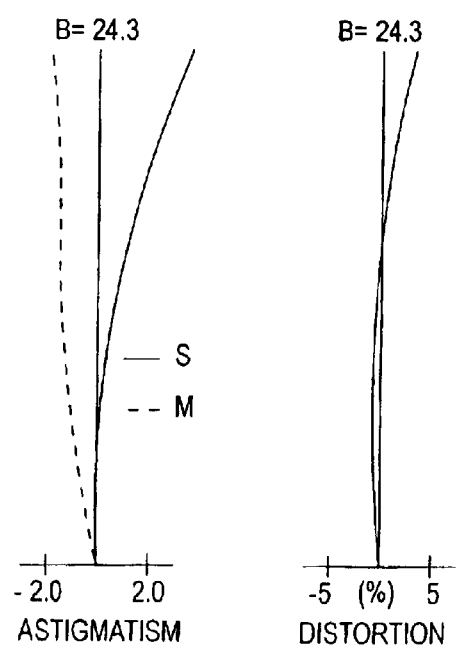
Fig. 4C    Fig. 4D

SPHERICAL ABERRATION
CHROMATIC ABERRATION

LATERAL CHROMATIC ABERRATION

ASTIGMATISM

DISTORTION

FNo.= 4.0

SPHERICAL
ABERRATION

CHROMATIC
ABERRATION

W=4.6

LATERAL
CHROMATIC
ABERRATION

W=4.6

ASTIGMATISM

W=4.6

DISTORTION

FNo.= 4.0

SPHERICAL
ABERRATION

CHROMATIC
ABERRATION

W=4.6

LATERAL
CHROMATIC
ABERRATION

W=4.6

ASTIGMATISM

W=4.6

DISTORTION

FNo.= 4.0

- d Line
- g Line
- C Line

-0.1  0.1
SPHERICAL
ABERRATION

CHROMATIC
ABERRATION

W=4.6

-0.01  0.01
LATERAL
CHROMATIC
ABERRATION

W=4.6

— S
-- M

-0.05  0.05
ASTIGMATISM

W=4.6

-1  (%)  1
DISTORTION

FNo.= 4.0

- d Line
- g Line
- C Line

-0.1  0.1
SPHERICAL
ABERRATION

CHROMATIC
ABERRATION

W=4.6

-0.01  0.01
LATERAL
CHROMATIC
ABERRATION

W=4.6

— S
-- M

-0.05  0.05
ASTIGMATISM

W=4.6

-1  (%)  1
DISTORTION

VIEWING APPARATUS HAVING A PHOTOGRAPHIC FUNCTION

BACKGROUND OF THE INVENTION

1. Field of the Invention

The present invention relates to a viewing apparatus, which includes (i) a viewing optical system, such as a telescope or binocular, and (ii) a photographing optical system which takes a picture of an object viewed through the viewing optical system, and by which an object being viewed through the viewing optical system can be recorded as a picture image at the same time.

2. Description of the Prior Art

A viewing apparatus, such as a telescope or a binocular, is known as a device for viewing an object at a far distance. However, in such a viewing apparatus of the prior art, the viewed image cannot be recorded as a picture image. There has been the concept of recording a viewed image by combining a viewing apparatus with a camera for a long time. On the other hand, few of such viewing apparatuses has satisfied users, since the viewing apparatus was very large and bulky.

A suitable magnification for a binocular which has been generally used as a viewing apparatus is about 7. At this magnification, an object at a far distance can be viewed in detail without adverse influence on hand shake, while the viewing apparatus is held in user's hands. However, the field of view which can be obtained by the binocular having a magnification of 7 is equivalent to the field of view obtained through a telephoto lens system with a focal length of 300 mm or more with respect to a 35 mm-format camera. In other words, if an attempt is made to materialize a function of covering the field of view substantially the same as that of a binocular in a general camera/binocular combination, the entire apparatus thereof inevitably becomes larger.

If an attempt is further made to record a picture image with a high quality in the above-mentioned optical arrangement, a higher optical performance is required in the photographing lens system. Consequently, the number of lens elements increases, and cost and weight increases are caused.

Still further, in order to maintain operability as a viewing apparatus, it is desirable for the focusing mechanism of the photographing optical system to move in association with a focusing operation of the binocular. However, since high focusing precision is required in a telephoto lens system having a long focal length of 300 mm as mentioned above, sufficient focusing precision cannot be obtained in an associated movement between the focusing operation of the binocular and the focusing mechanism of the photographing optical system.

SUMMARY OF THE INVENTION

The present invention provides a viewing apparatus with a photographic function, while the viewing apparatus is materialized without further enlargement of the apparatus nor a production-cost increase.

As an aspect of the present invention, there is provided a viewing apparatus with a photographing function including a viewing optical system and a photographing optical system. The viewing optical system includes a positive powered (hereinafter, positive) objective optical system and a eyepiece optical system, in this order from the object. An image of an object, formed by the positive objective optical system, is viewed though the eyepiece optical system. The photographing optical system is provided independently from the viewing optical system, and the photographing optical system covers substantially the same field of view as that of the viewing optical system. The viewing apparatus satisfies the following condition:

$$0.1 < ft/fo < 0.7 \tag{1}$$

wherein ft designates the focal length of the photographing optical system of said viewing apparatus, and fo designates the focal length of the objective optical system of the viewing optical system.

Preferably, the positive eyepiece optical system of the viewing optical system satisfies the following condition:

$$5 < fo/fe \tag{2}$$

wherein fe designates the focal length of the positive eyepiece optical system of the viewing optical system.

Even when the above conditions (1) and (2) are satisfied (even when the focal length of the photographing optical system in particular is shortened), enlargement of the viewing apparatus can be prevented without sacrificing the recording function of the photographing optical system. This is mainly because of the fact that digital cameras using an image pick-up device (e.g., CCD) have been widely used instead of conventional cameras using a silver-halide film. The CCD has developed rapidly to have higher density. Accordingly, the size of the image plane of a typical CCD is about one tenth of the size of a typical 35 mm-film format.

Moreover, by setting the focal length of the photographing optical system shorter than that of the objective optical system of the viewing optical system, sufficiently high focusing precision can be obtained, even when the focusing mechanism of the photographing optical system is moved in association with the focusing mechanism of the viewing optical system.

The viewing optical system can include a viewing-optical-system focusing mechanism which substantially maintains an image-forming position by moving at least a portion of the viewing optical system in the optical axis direction in accordance with a change in distance to the object.

The photographing optical system can include (i) a photographing-optical-system focusing mechanism which adjusts an image-forming position of an object to a predetermined position by moving at least a portion of the photographing optical system in the optical axis direction in accordance with a change in distance to the object, and (ii) an associated-focusing mechanism which operates the viewing-optical-system focusing mechanism and the photographing-optical-system focusing mechanism in an associated manner.

The viewing optical system includes a positive objective optical system and a positive eyepiece optical system through which an image formed by the objective optical system is viewed. Furthermore, it is practical to use the above viewing optical system as a binocular having a pair of positive objective optical systems and a pair of positive eyepiece optical systems through which an image formed by the objective optical systems is viewed. Still further, it is practical to use the above viewing optical system as a telescope including a positive objective optical system, and a positive eyepiece optical systems through which an image formed by the objective optical system is viewed.

In the case where the viewing optical system is applied to a binocular, the optical axis of said photographing optical system is preferably positioned between the optical axes of the pair of viewing optical systems of the binocular.

The photographing optical system is preferably provided for a digital camera in which an object image is formed on an image pick-up device (CCD), and recorded.

As an example of an optical system used as a telephoto lens system, a Petzval-type optical system is known in the art. A Petzval-type optical system includes a positive first lens group constituted by a positive lens element and a negative powered (hereinafter, negative) lens element, and a positive second lens group constituted by a positive lens element and a negative lens element. A Petzval-type optical system is used as a telephoto lens system since an adequate optical performance is obtained with a relatively smaller number of lens elements.

The photographing optical system of the viewing apparatus preferably includes a positive first lens group constituted by a positive lens element and a negative lens element, and a positive second lens group constituted by a positive lens element and a negative lens element, i.e., a Petzval-type optical system is utilized, and satisfies the following condition:

$$0.15 < D_{I\text{-}II}/f < 0.6 \quad (3)$$

wherein $D_{I\text{-}II}$ designates the distance between the positive first lens group and the positive second lens group, and f designates the focal length of the entire photographing optical system.

The photographing optical system can satisfy the following conditions:

$$1 < AC_I/AC_{II} \quad (4)$$

$$20 < \upsilon_{Ip} - \upsilon_{In} \quad (5)$$

wherein $AC_I$ designates the total sum of the absolute values of the reciprocal of the product of the focal length and the Abbe number ($|1/(fi*\upsilon i)|$) of each lens element in the positive first lens group; and $AC_{II}$ designates the total sum of the absolute values of the reciprocal of the product of the focal lengths and the Abbe number ($|1/(fi*\upsilon i)|$) of each lens elements in the positive second lens group.

$\upsilon_{Ip}$ designates the Abbe number of the positive lens element of the positive first lens group, and $\upsilon_{In}$ designates the Abbe number of the negative lens element of the positive first lens group.

The positive lens element and the negative lens element of the positive first lens group can be preferably cemented to each other.

The present disclosure relates to subject matter contained in Japanese Patent Application No. 2001-300480 (filed on Sep. 28, 2001) which is expressly incorporated herein in its entirety.

BRIEF DESCRIPTION OF THE DRAWINGS

The present invention will be discussed below in detail with reference to the accompanying drawings, in which:

FIG. 3 shows a lens arrangement of the viewing optical system of the viewing apparatus of FIG. 1;

FIGS. 4A, 4B, 4C and 4D show aberrations occurred in the lens arrangement shown in FIG. 3;

DESCRIPTION OF THE PREFERRED EMBODIMENTS

Figure 1:
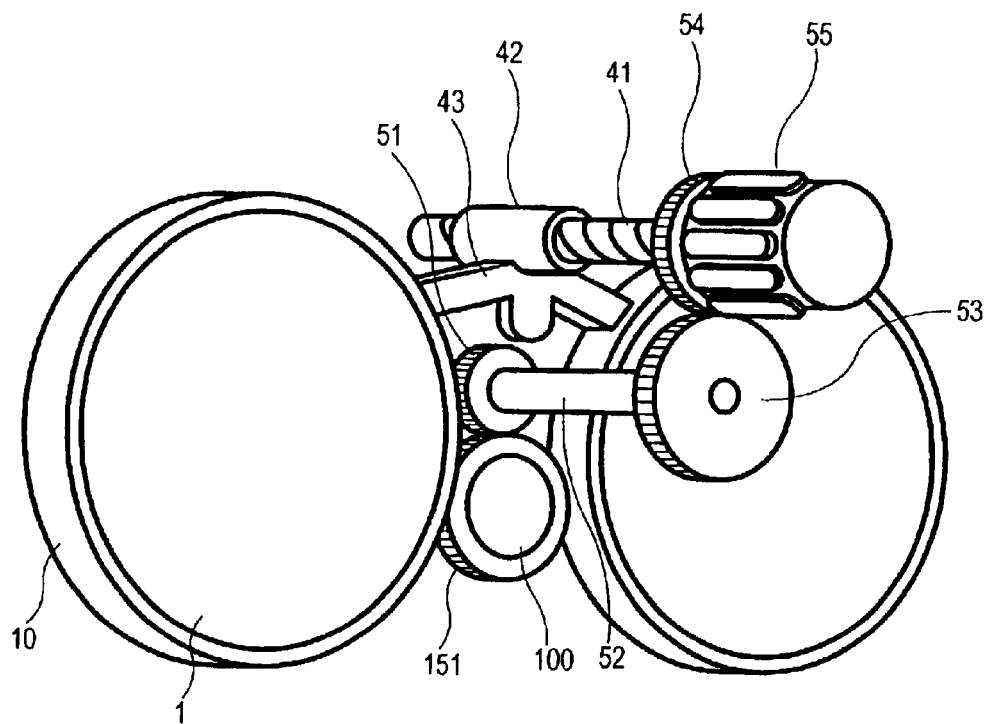
FIG. 1 is a schematic perspective view of a viewing apparatus with a photographing function, according to the present invention.

FIG. 1 is a schematic perspective view of a viewing apparatus with a photographing function, according to the present invention. The viewing apparatus is constituted by a combination of a binocular as a viewing optical system 1, and a photographing optical system 100 (see FIG. 2).

As well known in the art, in a binocular, a viewing optical system includes a pair of positive objective optical systems, a pair of erecting optical systems, and a pair of positive eyepiece optical systems, in this order from the object.

The objective optical system includes a plurality of lens elements for forming an inverted object image which is upside down and reversed from left to right. The erecting optical system (e.g., a Porro prism erecting system) is provided for erecting the inverted object image formed by the objective optical system to the proper orientation. The positive eyepiece lens system is provided for viewing the erected object image reinverted by the erecting optical system.

In FIG. 1, only a portion of the photographing optical system is shown for clarity.

In each viewing optical system 1, a portion of the objective optical system is fixed to each of a pair of frames 10. The two frames 10 are coupled via an arm 43. A hollow cylindrical member 42 is fixed to top center of the arm 43. The hollow cylindrical member 42 is provided on an inner peripheral surface thereof with a female threaded portion (not shown) in a direction parallel to the optical axis. A screw shaft 41 is inserted into the hollow cylindrical member 42 so that a male threaded portion formed on the screw shaft 41 is engaged with the female threaded portion of the cylindrical member 42. As shown in FIG. 1, a spur gear 54 and a manually-operable focusing knob 55 (hereinafter, the focusing knob) are coaxially fixed, side by side, to the end of the screw shaft 41.

When the focusing knob 55 is rotated, the screw shaft 41 rotates, and the hollow cylindrical member 42 moves backward and forward in accordance with the rotation. At this time, the arm 43 which is connected to the hollow cylindrical member 42 and the pair of the frames 10 which are fixed to the arm 43 are moved in the backward and forward directions at the same time; thereby a portion of the objective optical system of the viewing optical system 1 is moved in the optical axis direction so as to perform a focusing operation. Hence, the focusing knob 55, the screw shaft 41 on which the male threaded portion is formed, the hollow cylindrical member 42 and the arm 43 constitute a viewing-optical-system focusing mechanism.

The photographing optical system 100 is contained in a lens barrel where a helicoid mechanism for driving the lens barrel are formed. When the lens barrel is rotated through the helicoid mechanism, the photographing optical system 100 is moved along an optical axis O thereof to bring an object into an in-focus state.

A spur gear 151 is provided around an outer-surface portion of the lens barrel. The spur gear 151 is engaged with a spur gear 51. The spur gear 51 and a spur gear 53 which is engaged with the spur gear 54 are supported by a common shaft 52.

Due to the above structure, when the focusing knob 55 is rotated, the spur gear 151 rotates via the spur gear 54, the spur gear 53, the common shaft 52, and the spur gear 51. When the spur gear 151 is rotated, the lens barrel of the photographing optical system 100 rotates. Accordingly, the helicoid mechanism operates, so that a focusing operation is performed in the photographing optical system 100. In other words, according to the structure shown in FIG. 1, the focusing operation of the photographing optical system 100 is carried out in association with the focusing operation of the viewing optical system 1. The spur gears 151, 51, 53 and 54, and the common shaft 52 constitute a photographing-optical-system focusing mechanism.

Figure 2:
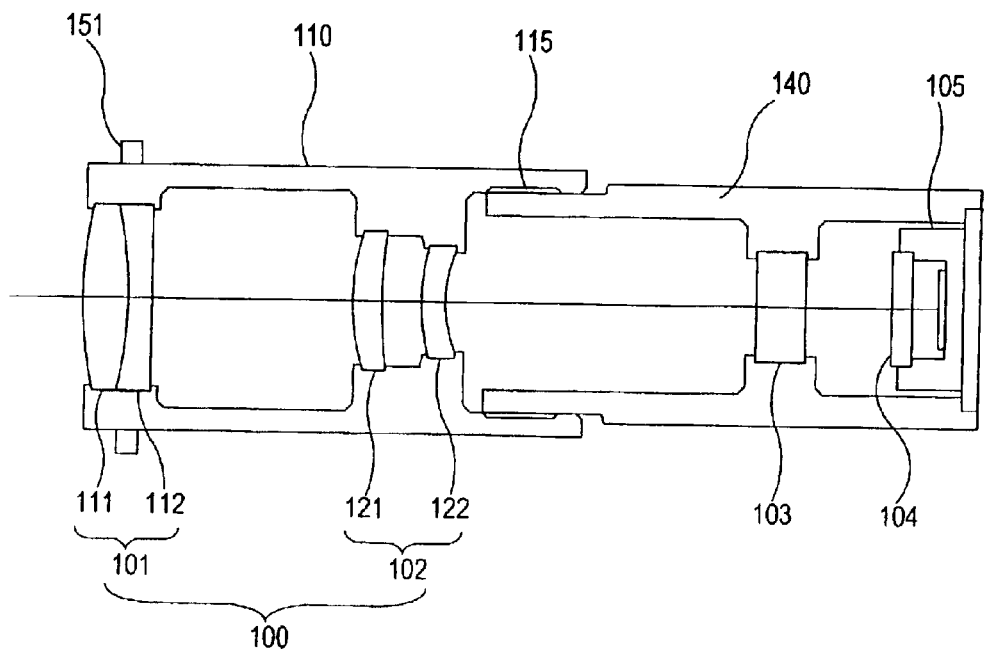
FIG. 2 shows a optical structure of the photographing optical system of the viewing apparatus shown in FIG. 1.

FIG. 2 shows an optical structure of the photographing optical system of the viewing apparatus shown in FIG. 1. The photographing optical system 100 includes a first lens group 101 constituted by cemented lens elements having a positive first lens element 111 and a negative second lens element 112, and a second lens group 102 constituted by a positive third lens element 121 and a negative fourth lens element 122, in this order from the object.

The photographing optical system 100 including the positive first lens element 111 through the negative fourth lens element 122 is supported by a movable frame 110. A filter 103 and an image pick-up device (CCD) 105 are supported by a stationary frame 140. As well known in the art, optical elements, such as a low-pass filter and an infrared-cut filter, etc., are provided in a digital camera; however, such optical elements are shown as a single filter for clarity in FIG. 2. Furthermore, a cover glass 104 is fixed to the front surface of the image pick-up device (CCD) 105.

The movable frame 110 is supported by the stationary frame 140 through a helicoid mechanism 115. Accordingly, the movable frame 110 moves along the optical axis direction when rotated. The spur gear 151 shown in FIG. 1 is fixed around an outer-surface portion of the movable frame 110. Due to the aforementioned photographing-optical-system focusing mechanism constituted by the spur gears 151, 51, 53 and 54, and the common shaft 52, the photographing optical system 100 can be moved in association with the viewing-optical-system focusing mechanism (refer to FIG. 1).

FIG. 3 shows a lens arrangement of the viewing optical system of the viewing apparatus of FIG. 1. More specifically, the viewing optical system of FIG. 3 is applied to a binocular. The binocular is provided with left and right viewing optical systems 1; however, note that FIG. 3 shows only one of the viewing optical systems 1 with a developed view of the prisms provided therein.

The binocular (viewing optical system 1) includes an objective optical system 01 constituted by cemented lens elements having a positive lens element and a negative lens element, an image-erecting optical system 02 constituted by a combination of a first prism and a second prism, and an eyepiece optical system 03 constituted by a positive meniscus lens having the concave surface facing toward the object and cemented lens elements having a positive lens element and a negative lens element, in this order from the object.

The image-erecting optical system 02 is constituted by the triangular first and second prisms so that the optical axis is inverted by 180 degrees; and the triangular first and second prisms are connected at right angle to each other. The image-erecting optical system 02 reinverts an inverted object image vertically and horizontally to form an erect object image with proper orientation. According to the binocular shown in FIG. 3, the inverted object image which is formed by the objective optical system 01 is reinverted vertically and horizontally by the image-erecting optical system 02, and an erected object image is formed on the side of the eyepiece from the last surface (surface No. 7) of the image-erecting optical system 02 so as to be viewable through the eyepiece optical system 03 as an erected object image.

In the case where the photographing distance range from infinity to the shortest photographing distance is constant, the shorter the focal length of an optical system is, the smaller the lateral magnification at the shortest photographing distance becomes. Therefore the traveling distance of an optical system from infinity (lateral magnification=0) to the shortest photographing distance, which is necessary for a focusing operation, becomes shorter, so that the required focusing precision decreases.

Condition (1) specifies the focal length of the photographing optical system 100 to be appropriately shorter than that of the viewing optical system 1. By satisfying this condition, focusing precision required to the photographing optical system 100 can be made lower than that of the viewing optical system 1; and the photographing-optical-system focusing mechanism can be operated in association with the viewing-optical-system focusing mechanism. Moreover, optical elements and structural members of the photographing optical system 100 can be formed in a size which can be easily processed and machined.

If ft/fo exceeds the upper limit of condition (1), the focal length of the photographing optical system 100 becomes too long. Consequently, associated movement between the photographing-optical-system focusing mechanism and the viewing-optical-system focusing mechanism becomes difficult, and the size of the photographing optical system 100 becomes larger.

If ft/fo exceeds the lower limit of condition (1), the focal length of the photographing optical system 100 becomes too short. Consequently, the size of the lens elements which constitute the photographing optical system 100 becomes too small, so that manufacture thereof becomes difficult, and the cost thereof increases.

Condition (2) is for setting a field of view relatively narrower by determining a magnification of the viewing optical system 1 relatively larger.

If the field of view of the viewing optical system 1 is set narrower, the field of view of the photographing optical system 100 to be combined with the viewing optical system 1 can also be made narrower. Accordingly, a Petzval-type optical system having a smaller angle-of-view can be used in the photographing optical system 100.

If fo/fe exceeds the lower limit of condition (2), the photographing optical system 100 with a wider angle-of-view is required; thereby the lens arrangement of the photographing optical system 100 becomes complicated, and the cost thereof increases.

Condition (3) is for optimizing the distance between the first lens group 101 and the second lens group 102 of the photographing optical system 100. By satisfying this condition, the diameter of the second lens group 102 can be made smaller, and the entire photographing optical system 100 can be prevented from being too long.

If $D_{I-II}/f$ exceeds the lower limit of condition (3), the diameter of the second lens group 102 of the photographing optical system 100 becomes too large, and the cost thereof increases.

If $D_{I-II}/f$ exceeds the upper limit of condition (3), the entire photographing optical system 100 becomes too long.

Condition (4) is for intensively performing the correcting of chromatic aberration by the positive first lens group 101, which means that a portion to which high precision is required is concentrated on the positive first lens group 101 only. By satisfying this condition, precision on the lens frame required to the positive second lens group 102 can be lowered, and manufacturing costs thereof can be reduced.

If $AC_I/AC_{II}$ exceeds the lower limit of condition (4), precision on the lens frame required to the positive second lens group 102 has also to be made higher, as required for the lens frame of the positive first lens group 1. Consequently, manufacturing costs thereof increase.

In the positive first lens group 101 in which the function of the correcting of chromatic aberration is specified by condition (4), condition (5) is for setting a difference between the Abbe numbers of the positive lens element 111 and the negative lens element 112 larger. By satisfying this condition, the following can be attained without making the power of the first lens element 111 and the second lens element 112 stronger:

(i) chromatic aberration is suitably corrected;

(ii) preferable optical performance is attained;

and (iii) precision to be required to a lens frame is lowered.

If $\upsilon_{Ip} - \upsilon_{In}$ exceeds the lower limit of condition (5), the power of the first lens element 111 and the second lens element 112 of the first lens group 101 has to be made stronger in order to obtain suitable correction of chromatic aberration. Consequently, higher order spherical aberration and coma excessively occur, so that preferable optical performance cannot be attained. Moreover, fluctuations of aberrations due to, e.g., decentration of lens elements become larger, so that higher machining precision is required, and an increase of manufacturing cost is caused.

Still Further, if an attempt is made to cement the positive lens element 111 and the negative lens element 112 of the first lens group 101 by which the correcting of chromatic aberration is intensively performed according to condition (4), deterioration on optical performance due to, e.g., decentration of lens elements can be eliminated. As a result, precision required to the lens frame can be lowered, thereby manufacturing cost can be further reduced.

Specific numerical data of the embodiments will be described hereinafter. Note that the following embodiments include an embodiment of the viewing optical system 1, and first through fifth embodiments of the photographing optical system 100.

In the diagrams of chromatic aberration represented by spherical aberration, the solid line and the two types of dotted lines respectively indicate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image, ER designates the radius of the exit pupil, and B designates the apparent visual angle (half amount, °). In the tables, DP designates the diopter (1/m) with respect to a viewed object at infinity, $F_{NO}$ designates the f-number, f designates the focal length of the entire zoom lens system, $f_B$ designates the back focal distance, W designates the half angle-of-view (°), r designates the radius of curvature, d designates the lens-element thickness or distance between lens elements, $N_d$ designates the refractive index of the d-line, and $\upsilon_d$ designates the Abbe number.

In addition to the above, an aspherical surface which is symmetrical with respect to the optical axis is defined as follows:

$$x = cy^2/(1+[1-\{1+K\}c^2y^2]^{1/2}) + A4y^4 + A6y^6 + A8y^8 + A10y^{10}$$

wherein:

c designates a curvature of the aspherical vertex (1/r);

y designates a distance from the optical axis;

K designates the conic coefficient; and

A4 designates a fourth-order aspherical coefficient;

A6 designates a sixth-order aspherical coefficient;

A8 designates a eighth-order aspherical coefficient; and

A10 designates a tenth-order aspherical coefficient.

The Embodiment of the Viewing Optical System

FIG. 3 shows a lens arrangement of the viewing optical system 1 of the viewing apparatus of FIG. 1. More specifically, in this embodiment, the viewing optical system 1 is applied to a binocular, and the prisms used in the binocular are shown as developed view. FIGS. 4A through 4D show aberrations occurred in the lens arrangement shown in FIG. 3. Table 1 shows the numerical data.

TABLE 1

W = 3.6
DP = −1.0

| Surface No. | R | D | $N_d$ | $\upsilon_d$ |
|---|---|---|---|---|
| 1 | 42.680 | 3.600 | 1.51633 | 64.1 |
| 2 | −26.766 | 1.500 | 1.62004 | 36.3 |
| 3 | −88.200 | 19.020 | — | — |
| 4 | ∞ | 22.890 | 1.51633 | 64.1 |
| 5 | ∞ | 2.000 | — | — |
| 6 | ∞ | 33.150 | 1.51633 | 64.1 |
| 7 | ∞ | 8.470 | — | — |
| 8* | −30.030 | 5.000 | 1.49176 | 57.4 |
| 9 | −7.700 | 2.540 | — | — |
| 10 | 19.310 | 5.750 | 1.69680 | 55.5 |

TABLE 1-continued

| 11 | −8.190 | 1.200 | 1.78472 | 25.7 |
|---|---|---|---|---|
| 12 | −16.161 | — | — | — |

*designates the a spherical surface which is rotationally symmetrical with respect to the optical axis.

Figure 5:
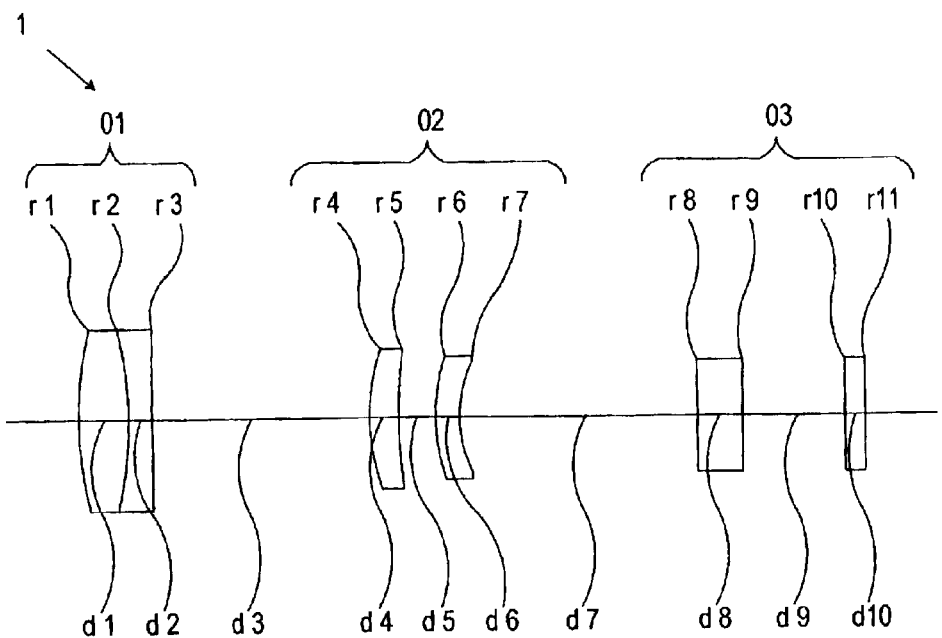
FIG. 5 shows a lens arrangement of the photographing optical system of the viewing apparatus shown in FIG. 1, according to a first embodiment of the photographing optical system.
Figure 6A:
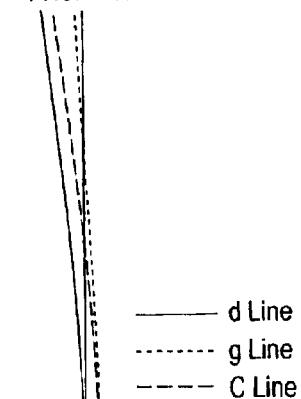
FIGS. 6A, 6B, 6C and 6D show aberrations occurred in the lens arrangement shown in FIG. 5 when an object at an infinite distance is in an in-focus state.
Figure 6B:
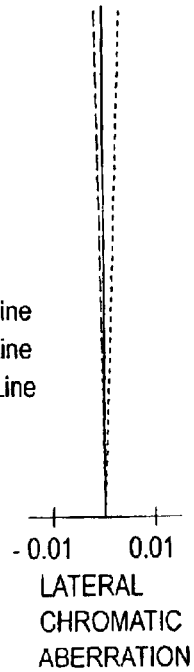
Figure 6C:
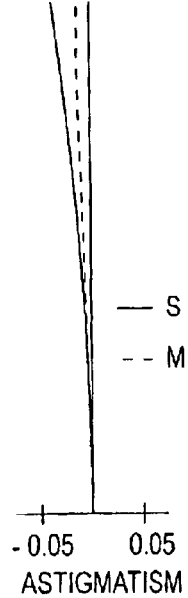
Figure 6D:
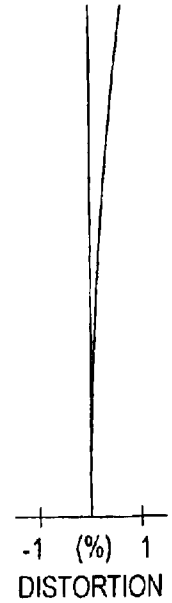
Figure 7A:
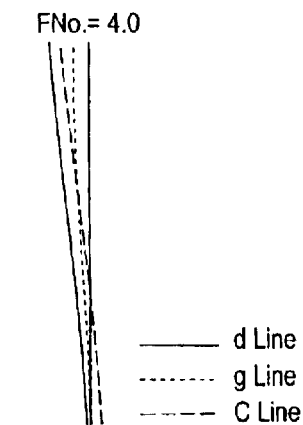
FIGS. 7A, 7B, 7C and 7D show aberrations occurred in the photographing optical system of the viewing apparatus shown in FIG. 1 when an object at an infinite distance is in an in-focus state, according to a second embodiment of the photographing optical system.
Figure 7B:
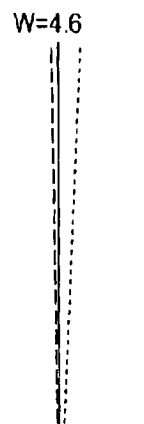
Figure 7C:
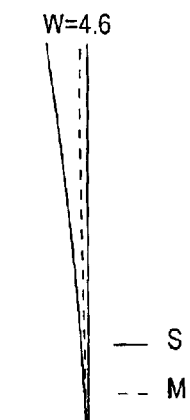
Figure 7D:
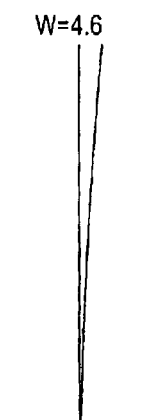
Figure 8A:
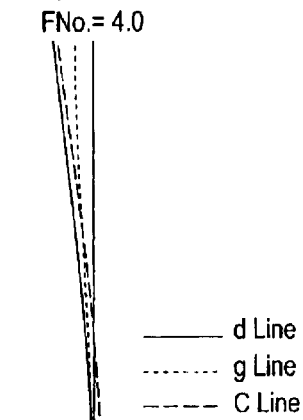
FIGS. 8A, 8B, 8C and 8D show aberrations occurred in the photographing optical system of the viewing apparatus shown in FIG. 1 when an object at an infinite distance is in an in-focus state, according to a third embodiment of the photographing optical system.
Figure 8B:
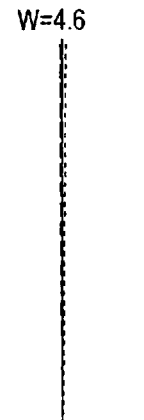
Figure 8C:
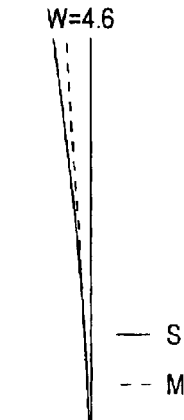
Figure 8D:
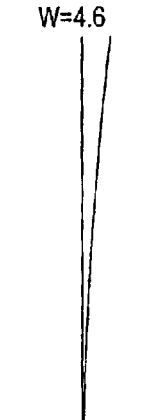
Figure 9A:
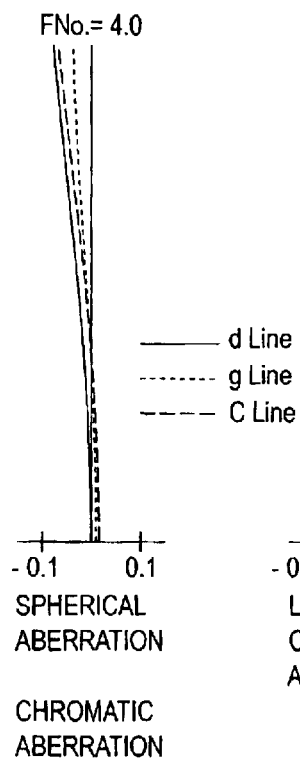
FIGS. 9A, 9B, 9C and 9D show aberrations occurred in the photographing optical system of the viewing apparatus shown in FIG. 1 when an object at an infinite distance is in an in-focus state, according to a fourth embodiment of the photographing optical system.
Figure 9B:
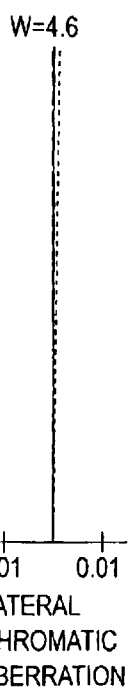
Figure 9C:
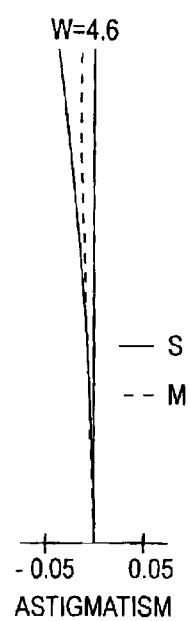
Figure 9D:
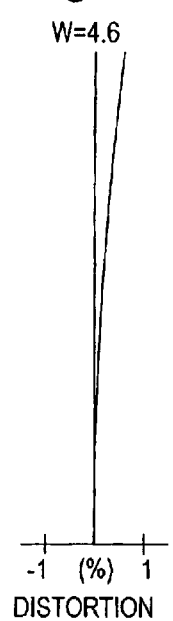
Figure 10A:
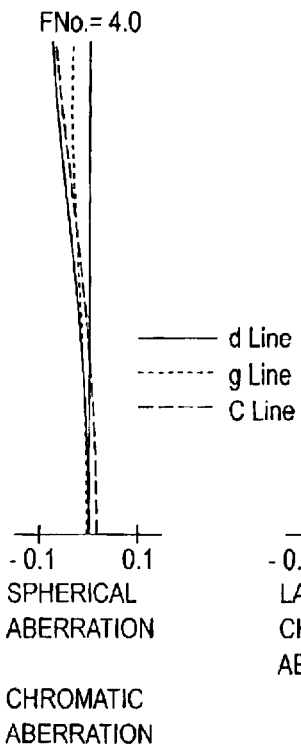
FIGS. 10A, 10B, 10C and 10D show aberrations occurred in the photographing optical system of the viewing apparatus shown in FIG. 1 when an object at an infinite distance is in an in-focus state, according to a fifth embodiment of the photographing optical system.
Figure 10B:
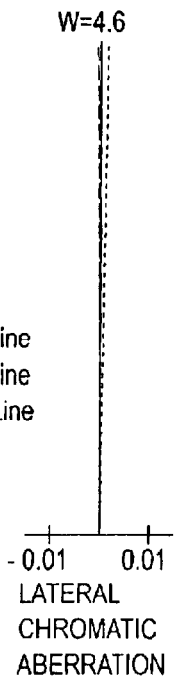
Figure 10C:
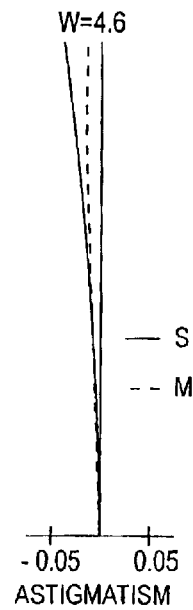
Figure 10D:
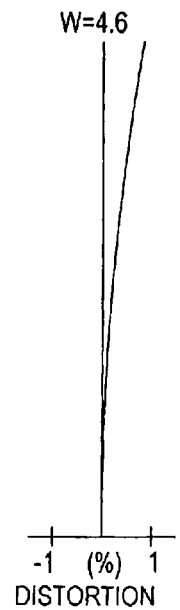

Aspherical surface data (the aspherical surface coefficients not indicated are zero (0.00)):
Surf. No. K A4 A6 A8
8 0.00000 −1.825×10$^{-3}$ 5.027×10$^{-5}$ −1.303×10$^{-6}$ Embodiment 1 of the Photographing Optical System FIG. 5 shows a lens arrangement of the photographing optical system 100 of the viewing apparatus shown in FIG. 1, according to the first embodiment of the photographing optical system. FIGS. 6A through 6D show aberrations occurred in the lens arrangement shown in FIG. 5 when an object at an infinite distance is in an in-focus state. Table 2 shows the numerical data.

TABLE 2

FNo. = 1:4.0
f = 37.09
W = 4.6
FB = 0.50

| Surface No. | R | D | N$_d$ | ν$_d$ |
|---|---|---|---|---|
| 1 | 20.848 | 2.300 | 1.51633 | 64.1 |
| 2 | −21.287 | 1.200 | 1.62004 | 36.3 |
| 3 | 1382.836 | 10.000 | — | — |
| 4 | 10.975 | 1.500 | 1.56384 | 60.7 |
| 5 | 27.139 | 2.000 | — | — |
| 6 | 10.799 | 1.200 | 1.59551 | 39.2 |
| 7 | 6.500 | 12.572 | — | — |
| 8 | ∞ | 2.500 | 1.51633 | 64.1 |
| 9 | ∞ | 5.000 | — | — |
| 10 | ∞ | 1.000 | 1.51633 | 64.1 |
| 11 | ∞ | — | — | — |

Embodiment 2 of the Photographing Optical system

FIGS. 7A through 7D show aberrations occurred in the photographing optical system 100 of the viewing apparatus shown in FIG. 1 when an object at an infinite distance is in an in-focus state, according to the second embodiment of the photographing optical system. Table 3 shows the numerical data of the second embodiment of the photographing optical system. The lens arrangement is the same as that of FIG. 5.

TABLE 3

FNo. = 1:4.0
f = 37.16
W = 4.6
FB = 0.50

| Surface No. | R | D | N$_d$ | ν$_d$ |
|---|---|---|---|---|
| 1 | 18.992 | 2.300 | 1.48749 | 70.2 |
| 2 | −15.875 | 1.200 | 1.54814 | 45.8 |
| 3 | 266.527 | 10.000 | — | — |
| 4 | 9.825 | 1.500 | 1.51633 | 64.1 |
| 5 | 27.922 | 0.493 | — | — |
| 6 | 11.257 | 1.200 | 1.58144 | 40.7 |
| 7 | 6.500 | 14.496 | — | — |
| 8 | ∞ | 2.500 | 1.51633 | 64.1 |
| 9 | ∞ | 5.000 | — | — |
| 10 | ∞ | 1.000 | 1.51633 | 64.1 |
| 11 | ∞ | — | — | — |

Embodiment 3 of the Photographing Optical System

FIGS. 8A through 8D show aberrations occurred in the photographing optical system 100 of the viewing apparatus shown in FIG. 1 when an object at an infinite distance is in an in-focus state, according to the third embodiment of the photographing optical system. Table 4 shows the numerical data of the third embodiment of the photographing optical system. The lens arrangement is the same as that of FIG. 5.

TABLE 4

FNo. = 1:4.0
f = 37.13
W = 4.6
FB = 0.50

| Surface No. | R | D | N$_d$ | ν$_d$ |
|---|---|---|---|---|
| 1 | 19.386 | 2.300 | 1.49700 | 81.6 |
| 2 | −16.785 | 1.200 | 1.54072 | 47.2 |
| 3 | 119.078 | 9.133 | — | — |
| 4 | 11.771 | 1.500 | 1.58913 | 61.2 |
| 5 | 24.222 | 2.000 | — | — |
| 6 | 9.995 | 1.500 | 1.56732 | 42.8 |
| 7 | 6.500 | 13.110 | — | — |
| 8 | ∞ | 2.500 | 1.51633 | 64.1 |
| 9 | ∞ | 5.000 | — | — |
| 10 | ∞ | 1.000 | 1.51633 | 64.1 |
| 11 | ∞ | — | — | — |

Embodiment 4 of the Photographing Optical System

FIGS. 9A through 9D show aberrations occurred in the photographing optical system 100 of the viewing apparatus shown in FIG. 1 when an object at an infinite distance is in an in-focus state, according to the fourth embodiment of the photographing optical system. Table 5 shows the numerical data of the fourth embodiment of the photographing optical system. The lens arrangement is the same as that of FIG. 5 except that surface Nos. 2 and 3 are separate from each other (i.e., the positive lens element 111 and the negative lens element 112 of the first lens group 101 are not cemented).

TABLE 5

FNo. = 1:4.0
f = 37.11
W = 4.6
FB = 0.50

| Surface No. | R | D | N$_d$ | ν$_d$ |
|---|---|---|---|---|
| 1 | 20.400 | 2.500 | 1.49700 | 81.6 |
| 2 | −17.175 | 0.200 | — | — |
| 3 | −16.637 | 1.200 | 1.54072 | 47.2 |
| 4 | 117.829 | 10.000 | — | — |
| 5 | 11.196 | 1.500 | 1.58913 | 61.2 |
| 6 | 30.676 | 2.000 | — | — |
| 7 | 10.819 | 1.200 | 1.56732 | 42.8 |
| 8 | 6.500 | 13.088 | — | — |
| 9 | ∞ | 2.500 | 1.51633 | 64.1 |
| 10 | ∞ | 5.000 | — | — |
| 11 | ∞ | 1.000 | 1.51633 | 64.1 |
| 12 | ∞ | — | — | — |

Embodiment 5 of the Photographing Optical System

FIGS. 10A through 10D show aberrations occurred in the photographing optical system 100 of the viewing apparatus shown in FIG. 1 when an object at an infinite distance is in an in-focus state, according to the fifth embodiment of the photographing optical system. Table 6 shows the numerical data of the fifth embodiment of the photographing optical system. The lens arrangement is the same as that of FIG. 5 except that surface Nos. 2 and 3 are separate from each other (i.e., the positive lens element 111 and the negative lens element 112 of the first lens group 101 are not cemented).

TABLE 6

FNo. = 1:4.0
f = 37.06
W = 4.6
FB = 0.50

| Surface No. | R | D | $N_d$ | $v_d$ |
|---|---|---|---|---|
| 1 | 18.637 | 2.500 | 1.49700 | 81.6 |
| 2 | −16.820 | 0.200 | — | — |
| 3 | −16.253 | 1.200 | 1.54072 | 47.2 |
| 4 | 341.443 | 14.581 | — | — |
| 5 | 11.454 | 1.500 | 1.58913 | 61.2 |
| 6 | 23.116 | 1.167 | — | — |
| 7 | 10.328 | 1.200 | 1.56732 | 42.8 |
| 8 | 6.500 | 9.175 | — | — |
| 9 | ∞ | 2.500 | 1.51633 | 64.1 |
| 10 | ∞ | 5.000 | — | — |
| 11 | ∞ | 1.000 | 1.51633 | 64.1 |
| 12 | ∞ | — | — | — |

The numerical values of each condition of each embodiment are shown in FIG. 7.

TABLE 7

The Embodiment of The Viewing Optical System

| Condition (2) | 7.0 | | | | |
|---|---|---|---|---|---|
| Photographing Optical System | Embod. 1 | Embod. 2 | Embod. 3 | Embod. 4 | Embod. 5 |
| Condition (1) | 0.560 | 0.561 | 0.561 | 0.561 | 0.560 |
| Condition (3) | 0.270 | 0.269 | 0.246 | 0.269 | 0.393 |
| Condition (4) | 1.156 | 1.142 | 1.386 | 1.103 | 1.267 |
| Condition (5) | 27.8 | 24.4 | 34.4 | 34.4 | 34.4 |

The Embodiment of the Viewing Optical System fo=66.19 fe=9.43

| Photographing Optical System | Embod. 1 | Embod. 2 | Embod. 3 | Embod. 4 | Embod. 5 |
|---|---|---|---|---|---|
| Ft | 37.09 | 37.16 | 37.13 | 37.11 | 37.06 |
| $AC_I$ | 0.0016 | 0.0016 | 0.0014 | 0.0014 | 0.0014 |
| $AC_{II}$ | 0.0014 | 0.0014 | 0.0010 | 0.0013 | 0.0011 |

As can be understood from Table 7, each embodiment satisfies each condition, and as can be understood from the aberration diagrams, the various aberrations are adequately corrected.

According to the above description, a viewing apparatus with a viewing function and a photographing function can be obtained without further enlargement of the apparatus nor a cost increase.

What is claimed is:

1. A viewing apparatus with a photographing function the viewing apparatus comprising:

a viewing optical system comprising a positive objective optical system and an eyepiece optical system, in this order from an object; and a photographing optical system comprising a positive first lens group comprising a positive lens element and a negative lens element, and a positive second lens group comprising a positive lens element and a negative lens element;

wherein an image of an object, formed by said positive objective optical system, is viewed though said eyepiece optical system;

wherein said photographing optical system is provided independently from said viewing optical system, and said photographing optical system covers substantially the same field of view as that of said viewing optical system;

wherein said viewing apparatus satisfies the following condition:

$$0.1 < ft/fo < 0.7$$

and wherein said photographing optical system satisfies the following condition:

$$0.15 < D_{I-II}/f < 0.6$$

wherein ft designates the focal length of said photographing optical system of said viewing apparatus, fo designates the focal length of said objective optical system of said viewing optical system, $D_{I-II}$ designates the distance between said positive first lens group and said positive second lens group, and f designates the focal length of said entire photographing optical system.

2. A viewing apparatus according to claim 1, wherein said eyepiece optical system has a positive power, and satisfies the following condition:

$$5 \leq fo/fe$$

wherein fe designates the focal length of said positive eyepiece optical system of said viewing optical system.

3. A viewing apparatus according to claim 1, wherein said viewing optical system comprises a viewing-optical-system focusing mechanism which substantially maintains an image forming position by moving at least a portion of said viewing optical system in the optical axis direction in accordance with a change in distance to the object; and wherein said photographing optical system comprises a photographing-optical-system focusing mechanism which adjusts an image-forming position of an object to a predetermined position by moving at least a portion of the photographing optical system in the optical axis direction in accordance with a change in distance to the object; and an associated-focusing mechanism which operates said viewing-optical-system focusing mechanism and said photographing-optical-system focusing mechanism in an associated manner.

4. A viewing apparatus according to claim 1, wherein said viewing optical system comprises a telescope comprising a positive objective optical system, and a positive eyepiece optical systems through which an image formed by said objective optical system is viewed.

5. A viewing apparatus according to claim 1, wherein said viewing optical system comprises a binocular comprising a pair of positive objective optical systems and a pair of positive eyepiece optical systems through which an image formed by the objective optical systems is viewed.

6. A viewing apparatus according to claim 5, wherein the optical axis of said photographing optical system is positioned between the optical axes of said pair of viewing optical systems of said binocular.

7. A viewing apparatus according to claim 1, wherein said photographing optical system forms an object image on an image pick-up device, and records said object image.

8. A viewing apparatus according to claim 1, satisfying the following conditions:

$$1 < AC_I/AC_{II}$$

$$20 < v_{Ip} - v_{In}$$

wherein $AC_I$ designates the total sum of the absolute values of the reciprocal of the product of the focal length and the Abbe number ($|1/(fi*vi)|$) of each lens elements in said positive first lens group; and $AC_{II}$ designates the total sum of the absolute values of the reciprocal of the product of the focal lengths and the Abbe number($|1/(fi*vi)|$) of each lens elements in said positive second lens group.

$v_{Ip}$ designates the Abbe number of said positive lens element of said positive first lens group, and $v_{In}$ designates the Abbe number of said negative lens element of said positive first lens group.

9. A viewing apparatus according to claim 8, wherein said positive lens element and said negative lens element of said positive first lens group are cemented to each other.

* * * * *